E. A. CHATFIELD.
Improvement in Wagon Body Lifter.

No. 124,720. Patented March 19, 1872.

Witnesses:
John Becker.
Geo. W. Mabee

Inventor:
E. A. Chatfield
Per
Attorneys

UNITED STATES PATENT OFFICE.

EDWARD A. CHATFIELD, OF WATERLOO, IOWA.

IMPROVEMENT IN WAGON-BODY LIFTERS.

Specification forming part of Letters Patent No. 124,720, dated March 19, 1872.

Specification describing a new and useful Improvement in Wagon-Body Lifter, invented by EDWARD A. CHATFIELD, of Waterloo, in the county of Black Hawk and State of Iowa.

Figure 1:
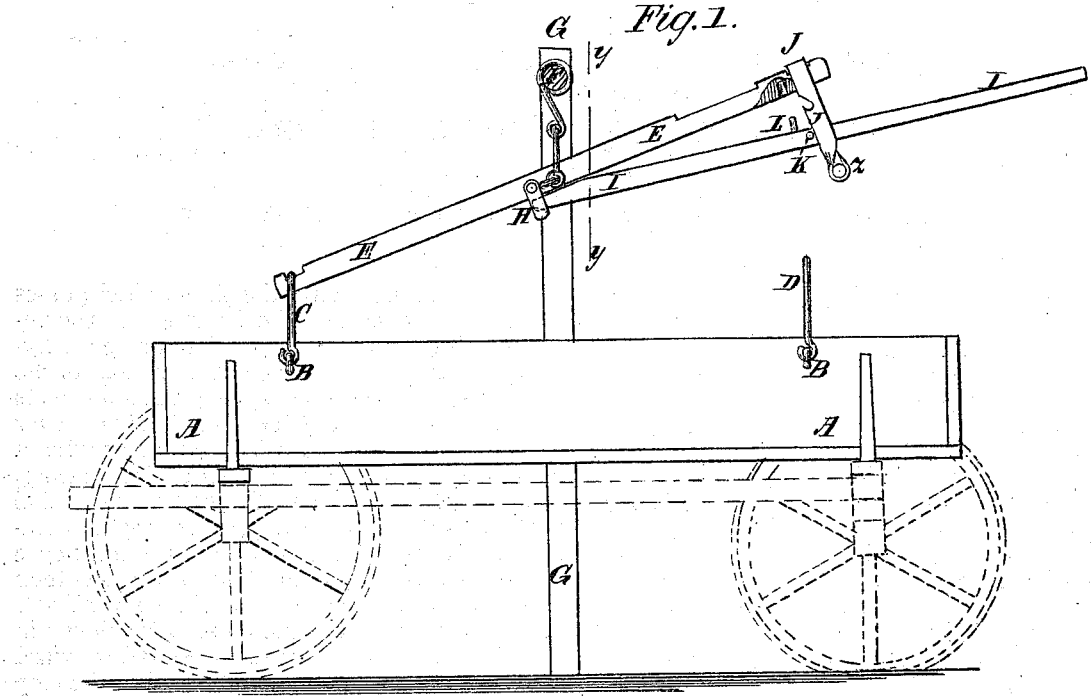
Figure 2:
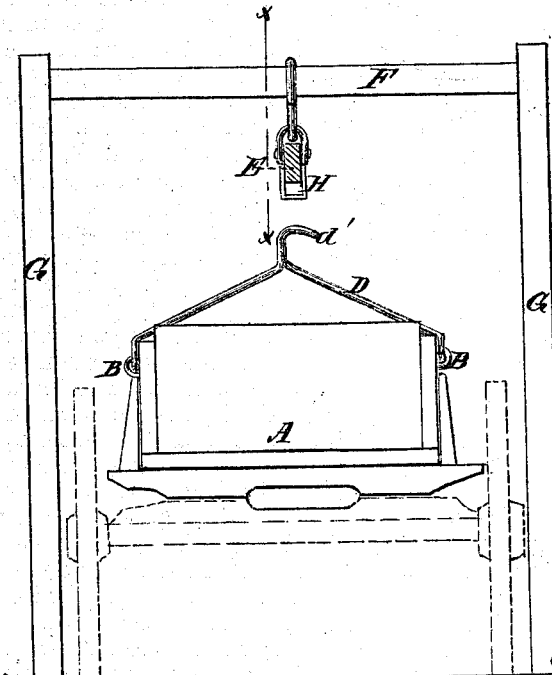

Figure 1 is a side view of my improved device, partly in section, through the line $x\,x$, Fig. 2. Fig. 2 is a detail sectional view of the same taken through the line $y\,y$, Fig. 1.

Similar letters of reference indicate corresponding parts.

My invention has for its object to furnish an improved apparatus for lifting wagon-boxes, wood-racks, hay-racks, &c., from and lowering them upon the running-gearing of wagons, which shall be simple in construction, effective in operation, and convenient in use, enabling a single person, or even a boy, to readily remove and replace a wagon-body or rack. And it consists in the construction and combination of the various parts of the apparatus, as hereinafter more fully described.

A represents an ordinary wagon-box, to the sides of which, near its front and rear end, are attached staples or eyebolts B. One pair of the eyes B is designed to receive the hooks formed upon the ends of the iron loop C, and the other pair of eyes is designed to receive the hooks formed upon the ends of the iron loop D, which has a hook, $d'$, formed upon its middle part. E is a lever, which is supported from and pivoted to a cross-bar or roller, F, the ends of which are supported by posts G or other suitable frame-work. In sheds, wagon-houses, &c., the lever E may be supported by a chain attached to the rafters or other suitable part of the frame-work of the building. To the under side of the lever E, near its pivoting-point, is attached a socket or keeper, H, to receive the end of the lever I. J is a loop, through which the lever I passes, and which has an eye, 1, formed upon its lower end to receive the hook $d'$ of the loop D. The loop J is made so large that it may be readily slipped upon and from the end of the lever E, which is notched upon its upper side to prevent the said loop J from slipping off accidentally. In the inner edge of the loop J, near the lower side of the lever E, are formed inclined notches 2, to receive the ends of the pin K, which passes transversely through the lever I. To the upper side of the lever I is attached an upwardly-projecting pin, L, which enters a hole in the under side of the lever E, when the pin K rests in the notches of the loop J to hold the lever I steady. In using the device for removing a wagon-body or rack from the running-gearing, the wagon is run beneath the lever E. The loop C is then attached to the rear eyes or staples B, and the hook-loop D to the front eyes or staples B. The end of the lever E is then passed beneath the loop C. The lever I and loop J are applied to the lever E, as shown in Fig. 1. The lever I is then pressed downward until the eye 2, upon the lower end of the loop J, can be passed over the hook $d'$ of the loop D. The lever I is then raised until the pins K enter the notches 1 of the loop J, and the pin L enters the hole in the under side of the lever E. The lever I is then lowered and moved a little to one side, so as to release the loop J from the hook $d'$, and the two levers E I are passed beneath the hook $d'$. Now, by raising the forward end of the body a very little it will take a horizontal position clear of the running-gearing, which may be drawn from beneath it. When out of doors, the suspended body or rack may be connected with one of the posts G by a hook, to prevent it from being swung about by the wind. In replacing the body or rack upon the running-gearing, the running-gearing is run beneath the suspended body or rack. The forward end of the body or rack is pulled forward and downward until it is in or nearly in place upon the forward bolster. The lever I is then pressed downward and to one side, to remove the levers E I from the hook $d'$, which hook $d'$ is then passed through the eye 2 of the loop J. The lever I is then raised slightly to raise the pin K out of the notches 1 in the loop J. The levers I E are then pressed downward to release the loop J from the hook $d'$, when the rear end of the box or rack may be lowered to its place upon the rear bolster.

It will be observed that the lever I and loop J are detachable, so that a single lever I and loop J may be used with any desired number of suspended levers E.

Having thus described my invention, I claim as new and desire to secure by Letters Patent—

The loop C, hook-loop D d', suspended lever E, socket or keeper H, lever I, loop J provided with an eye, 1, and notches 2, and pins K L, in combination with each other, for removing a wagon-body or rack from and replacing it upon the running-gearing, substantially as herein shown and described.

EDWARD A. CHATFIELD.

Witnesses:
CHARLES CARROLL MARSH.
JAMES MORRILL.